US009747472B2

(12) United States Patent
Buer

(10) Patent No.: US 9,747,472 B2
(45) Date of Patent: Aug. 29, 2017

(54) MESH GRID PROTECTION

(75) Inventor: Mark Buer, Gilbert, AZ (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 2744 days.

(21) Appl. No.: 12/210,013

(22) Filed: Sep. 12, 2008

(65) Prior Publication Data

US 2009/0077669 A1  Mar. 19, 2009

Related U.S. Application Data

(60) Provisional application No. 60/972,202, filed on Sep. 13, 2007.

(51) Int. Cl.
*G06F 21/00* (2013.01)
*G06F 21/86* (2013.01)
*H01L 23/00* (2006.01)

(52) U.S. Cl.
CPC .......... *G06F 21/86* (2013.01); *H01L 23/576* (2013.01); *G06F 2221/2101* (2013.01); *H01L 2924/0002* (2013.01)

(58) Field of Classification Search
USPC ............................................ 725/24; 455/414
See application file for complete search history.

(56) References Cited

U.S. PATENT DOCUMENTS

| 4,833,618 | A | 5/1989 | Verma et al. |
| 5,288,949 | A * | 2/1994 | Crafts ........................... 174/250 |
| 5,861,662 | A | 1/1999 | Candelore |
| 6,496,119 | B1 | 12/2002 | Otterstedt et al. |
| 7,158,986 | B1 * | 1/2007 | Oliver et al. |
| 7,343,626 | B1 * | 3/2008 | Gallagher ........................ 726/25 |
| 7,539,632 | B1 * | 5/2009 | Chakrabarti et al. ........ 705/26.1 |
| 7,723,998 | B2 * | 5/2010 | Doi ................................ 324/555 |
| 7,836,051 | B1 * | 11/2010 | Mason ........................... 707/734 |
| 7,925,691 | B2 * | 4/2011 | Westphal ...................... 709/203 |
| 2004/0227549 | A1 | 11/2004 | Solie |
| 2005/0102358 | A1 * | 5/2005 | Gold et al. ..................... 709/204 |
| 2006/0123376 | A1 | 6/2006 | Vogel et al. |
| 2006/0195442 | A1 * | 8/2006 | Cone et al. ....................... 707/5 |

(Continued)

FOREIGN PATENT DOCUMENTS

| EP | 0 268 142 A2 | 5/1988 |
| EP | 1 670 059 A1 | 6/2006 |
| WO | WO 2007/091210 A2 | 8/2007 |

OTHER PUBLICATIONS

International Search Report for International Application No. PCT/US08/10705, United States Patent and Trademark Office, Alexandria, VA, United States, mailed on Dec. 8, 2008.

(Continued)

*Primary Examiner* — Zeshan Qayyum
(74) *Attorney, Agent, or Firm* — Sterne, Kessler, Goldstein & Fox PLLC

(57) ABSTRACT

A mesh grid protection system is provided. The protection system includes a plurality of grid lines forming a mesh grid proximate to operational logic. The protection system also includes tamper-detection logic coupled to the plurality of grid lines and configured to toggle a polarity of a signal on at least one grid line at each clock cycle and to detect attempts to access the operational logic by comparing a reference signal driving a first end of a grid line to a signal at the opposite end of the grid line.

32 Claims, 5 Drawing Sheets

(56) References Cited

U.S. PATENT DOCUMENTS

| | | | |
|---|---|---|---|
| 2006/0253579 A1* | 11/2006 | Dixon et al. | 709/225 |
| 2006/0253583 A1* | 11/2006 | Dixon et al. | 709/225 |
| 2007/0011023 A1 | 1/2007 | Silverbrook | |
| 2007/0155328 A1 | 7/2007 | Turner | |
| 2008/0109473 A1* | 5/2008 | Dixon et al. | 707/102 |
| 2008/0126176 A1* | 5/2008 | Iguchi | 705/10 |
| 2008/0172382 A1* | 7/2008 | Prettejohn | 707/6 |
| 2009/0024605 A1* | 1/2009 | Yang | 707/5 |
| 2009/0112974 A1* | 4/2009 | Ravikumar et al. | 709/203 |
| 2009/0216577 A1* | 8/2009 | Killebrew | 705/7 |
| 2009/0222907 A1* | 9/2009 | Guichard | 726/17 |

OTHER PUBLICATIONS

International Preliminary Report on Patentability with Written Opinion of the International Searching Authority for International Application No. PCT/US2008/010705, The International Bureau of WIPO, Geneva, Switzerland, issued on Mar. 16, 2010.

Supplementary European Search Report, dated Jul. 29, 2011, for European Patent Appl. No. 08830241.9,7 pages.

\* cited by examiner

MESH GRID PROTECTION

CROSS-REFERENCE TO RELATED APPLICATIONS

This application claims the benefit of U.S. Provisional Application No. 60/972,202 filed Sep. 13, 2007, which is incorporated herein by reference in its entirety.

BACKGROUND OF THE INVENTION

Field of the Invention

This invention generally relates to security of integrated circuit devices and specifically to mesh grid protection for integrated circuits.

Background Art

Logic circuits and memory on electronic devices such as integrated circuits (IC) are vulnerable to hardware hacking. Integrated circuits storing or utilizing secure data such as cryptographic keys or other user sensitive data such as credit card numbers are particularly targeted. One style of hardware hacking involves penetrating an IC enclosure or package to physically access the internal logic circuitry and/or memory of the IC. In these attacks, the package is opened from the top or bottom and any encapsulating material is removed or etched away. The hacker can then access the internal logic circuitry and/or memory of the IC using a probe. The hacker can read signals in the internal logic circuitry or memory of the IC to derive secure data or can in some cases access restricted data directly. In other techniques, hardware hackers set up probes to read pins of chips in point-of-sale terminals and ATM machines to access credit card information.

Methods and systems are therefore needed to improve the physical security of devices.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

The present invention will now be described with reference to the accompanying drawings. In the drawings, like reference numbers may indicate identical or functionally similar elements.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The present invention describes system and methods for protecting data in logic circuits using a mesh grid. The mesh grid detects attempts to tamper with a package or circuit board. It will be understood that the essential concepts disclosed herein are applicable to a wide range of electronic circuits and systems, architectures and hardware elements.

Figure 1:
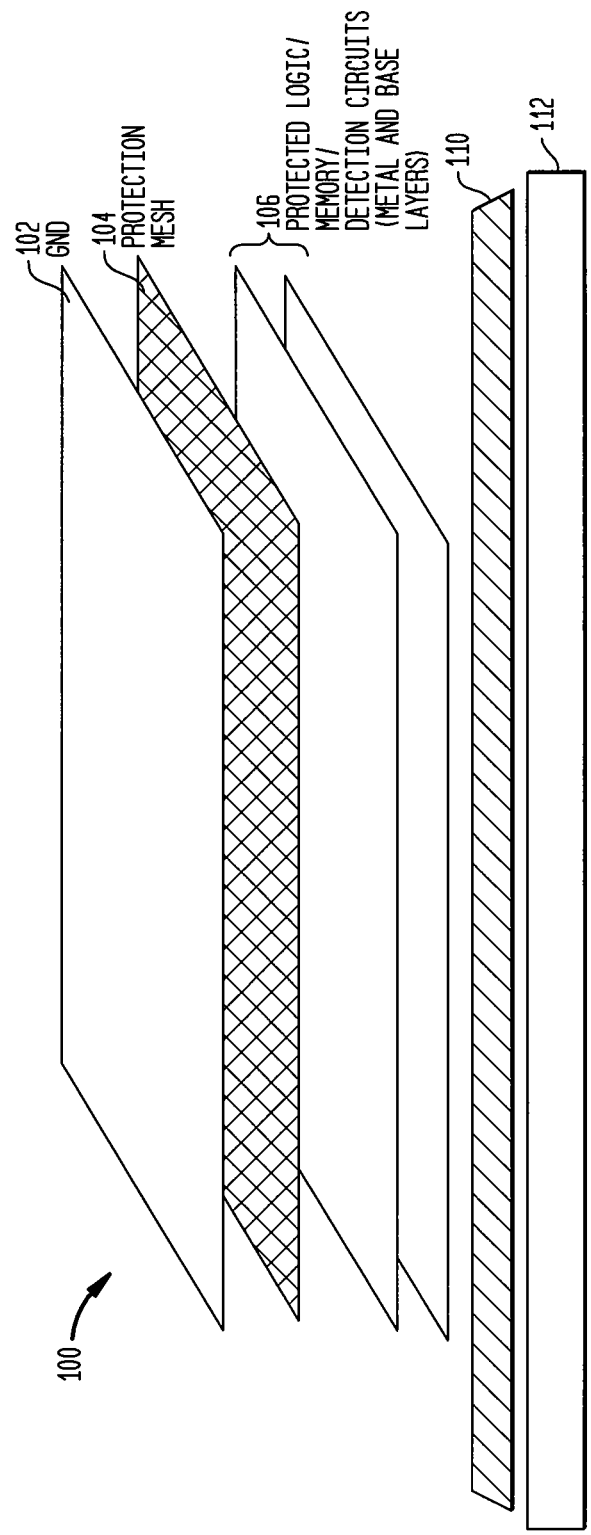
FIG. 1 illustrates a cross section of a mesh grid protection system, according to an embodiment of the invention.

FIG. 1 illustrates a cross section of a mesh grid protection system 100, according to an embodiment of the invention. Mesh grid protection system 100 includes a ground plane 102, internal mesh grid 104, optional external mesh grid layer 110 and one or more layers 106 having protected logic. In an embodiment, the ground plane 102 and/or protection mesh layer 104 are located at the redistribution (RDL) layer of a die of an integrated circuit. In an embodiment, ground plane 102, internal mesh grid 104 and protection logic 106 are located inside a package of an integrated circuit and external mesh grid 110 is located either in the plastic at the bottom layer of the package of the IC that includes the die or on a circuit board 112 below the package. In another embodiment, a mesh grid is partially on the die that includes the protected logic layer 106 and is partially in the plastic of a package of an IC that includes the die. It is to be appreciated by persons of skill in the art that the package may be made of other material than plastic based on implementation needs.

A device incorporating mesh protection system 100 may be, for example, used in an ATM or point-of-sale terminals to process credit/debit card information. In another example the device may be used to store and utilize cryptographic keys for applications requiring cryptographic operations (e.g. set-top converter boxes).

Internal mesh grid 104 enables detection of an attempt to physically breach the package from the top to access protected logic 106. External mesh grid 110 enables detection of an attempt to physically breach the package from the bottom (e.g. through circuit board 112). In an embodiment, external mesh 110 may be built into circuit board 112. In an alternate embodiment, external mesh 110 is built into a bottom portion of the package of an IC. Grid 110 may comprise multiple grids 110a-b (FIG. 4) on different layers of circuit board 112 or different layers on a bottom portion of a package of an IC. External mesh 110 also enables detection of an attempt to read pins of IC 108 by breaching circuit board 112 from the bottom. For example, in machines such as an ATM machine or a credit card reader, a hacker may attempt to read credit card information being transmitted to an IC that includes protected logic 106. The hacker may do so by drilling into circuit board 112 and access pins of the IC. Alternatively, a hacker may attempt to read data in protected logic 106 by drilling into the IC from the top of its package. Internal mesh grid 104 and/or external mesh grid 110 provide protection against hacking of protected logic 106 or access to pins of an IC encapsulating protected logic 106. Circuits and control logic for internal mesh grid 104 and external mesh grid 110 are described in further detail below.

In an embodiment, upon detection of an open or short line in grid 104 or grid 110, control logic (not shown) clears memory (not shown) of the device and/or causes the device with protected logic 106 to power down and stop processing data. For example, if the device stores credit card numbers or cryptographic keys in memory then this data is deleted to ensure that sensitive data is not divulged. It is to be appreciated by persons skilled in the art that mesh grids described herein may be used to protect any type of control logic, integrated circuit or device storing secure or sensitive data.

Figure 2:
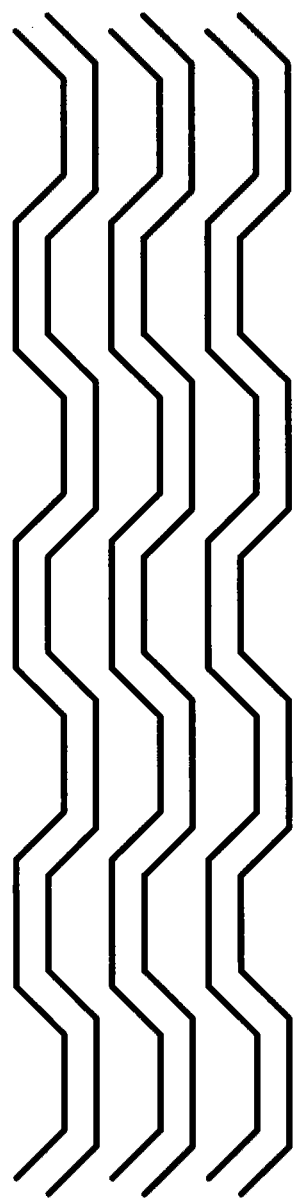
FIG. 2 depicts an exemplary mesh grid layout, according to an embodiment of the invention.

FIG. 2 depicts an exemplary mesh layout 200 according to an embodiment of the invention. Mesh layer layout 200 may be used for both internal mesh grid 104 and/or external mesh grid 110. Although mesh layer 200 is depicted as a series of serpentine lines, a person of skill in the art would recognize that any configuration could be used for the protection mesh. In addition, the protection mesh may include any number and density of lines.

Figure 3:
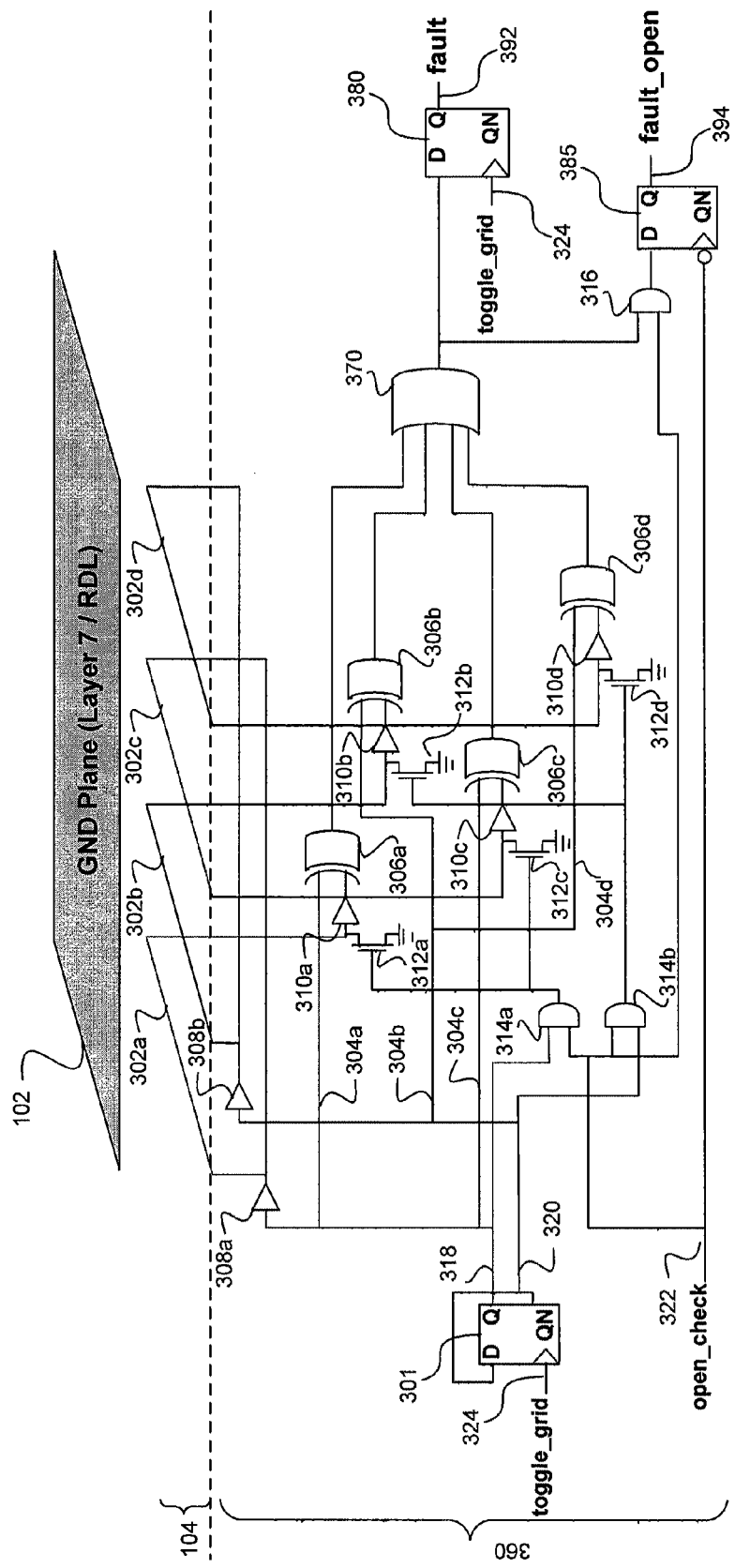
FIG. 3 illustrates an exemplary internal mesh grid tamper detection system, according to an embodiment of the invention.

FIG. 3 illustrates internal mesh grid tamper-detection system 300 according to an embodiment of the invention. In an embodiment, internal mesh grid and tamper-detection system 300 is below ground plane 102. Internal mesh grid and tamper-detection system 300 comprises internal protection mesh grid 104 and detection layer 360. Internal protection mesh grid 104 comprises mesh lines 302a-d. As would be appreciated by persons of skill in the art, mesh grid 104 could include significantly more lines, as required by a specific implementation.

Detection layer 360 comprises buffers 308a-b, flip-flop 301, flip-flop 380 and flip-flop 385; XOR gates 306a-d, OR gate 370, AND gates 314a-b and 316, pull-down circuits 312a-d and buffers 310a-d. Detection layer 260 is configured to detect attempts to physically access protected logic 106 and/or breach the package of an IC having protected logic 106. In an embodiment, detection layer includes logic to detect open circuits or short circuits created in the protection mesh 104.

Toggle_grid signal 324 provides a clock for flip-flop 301 and flip-flop 380. Output QN 320 of flip-flop 301 is coupled to the input D of flip-flop 301 thereby toggling output Q 318 and output QN 320 to a high (1) or a low (0) signal value at every clock cycle. Output Q 318 of flip-flop 301 is coupled to buffer 308a which drives grid lines 302a and 302c. Output 318 is also coupled to AND gate 314a, XOR gate 306a and XOR gate 306c. Output QN 320 is coupled to buffer 308b which drives grid lines 302b and 302d. Output QN 320 is also coupled to AND gate 314b, XOR gate 306b and XOR gate 306d. The same signals may be used to drive lines in external grid 110.

In an alternate embodiment, a linear feedback shift register (LFSR) (not shown) may be substituted for flip-flop 301. For example, the lower four bits of a 32-bit LFSR may be used to drive lines 302a-d. The LFSR may be seeded by a random (or pseudo-random) number generated by a random number generator (not shown). The number of lines 302 that may be driven by the LFSR is only limited by the length of the LFSR. In an embodiment, any number of lines may be driven by the LFSR by re-using certain bit positions of the LFSR. Using an LFSR increases the randomness of values assigned to grid lines 302 each clock cycle 324 thereby increasing the difficulty for a hacker to emulate signals on the grid lines 302 and bypass protection. The same signals may be used to drive lines in external grid 110.

Open_check signal 322 provides an active low input clock for flip-flop 385. Open_check signal 322 is coupled to AND gates 314a-b. Output of AND gate 314a is coupled to pull-down circuit 312a and to pull-down circuit 312c. Output of AND gate 314b is coupled to pull-down circuits 312b and pull-down circuit 312d. Pull-down circuits 312a-d couples an input of XOR gates 306 to ground when a corresponding line 302 is cut or open and when open_check enable signal is asserted high.

Buffer 310a and buffer 310c are respectively coupled to line 302a and line 302c. Buffers 310b and 310d are respectively coupled to line 302b and line 302d. XOR gate 306a and XOR gate 306c are both coupled to signal Q 318. XOR gate 306b and XOR gate 306d are both coupled to signal QN 320. The inputs of OR gate 370 are coupled to the outputs of XOR gates 306a-d. The output of OR gate 370 is coupled to input D of flip-flop 380 and to AND gate 316. AND gate 316 is also coupled to open_check enable signal 322. Output of AND gate 316 is coupled to the input D of flip-flop 385. XOR gates 306a and 306c are coupled indirectly to input Q 318 via grid line 302a and line 302c respectively. XOR gate 306a and XOR gate 306c are also coupled directly to signal Q 318. XOR gates 306b and 306d are coupled directly to signal QN 320. XOR gates 306b and 306d are coupled indirectly to signal QN 320 via grid line 302b and grid line 302d respectively.

During operation, the signals in adjacent grid lines 302 alternate between a high or a low signal at every clock cycle of signal toggle_grid 324. If an LFSR is used instead of flip-flop 301, then grid lines 302 have a random high or low signal value based on a polynomial and seed value used for the LFSR. At least two adjacent grid lines in the plurality of grid lines have a different polarity signal at each clock cycle. Since the values in at least two adjacent lines are different and toggle every clock cycle it is hard for a hacker to determine the exact sequence of signals propagating through grid lines 302a-d. Another advantage of toggling signals in grid 104 is to reduce power consumption since only the high lines have to be driven. If any of grid lines 302a-d is cut (i.e. open) or shorted, the corresponding XOR gate 306a-d is enabled to generate a high signal that is fed to OR gate 370. OR gate 370 logically ORs the outputs of XOR gates 306a-d. The output of OR gate 370 is coupled directly to input D of flip-flip 380 and to input D of flip-flop 385 via AND gate 316. The output of OR gate 370 is propagated via flip-flop 380 as "fault" signal 392. The output of OR gate 370 is logically ANDed with open_check signal 322 with the ANDed result propagated via flip-flop 380 as "fault_open" signal 394.

Open_check signal 322 enables detection of whether any of lines 302a-d are open via the fault_open signal 394. If open_check signal 322 is set high, then pull-down circuits 312 will couple corresponding inputs of XOR gates 306 to ground if any of corresponding lines 302 are cut or open. A high signal is driven on lines 302a-d in conjunction with setting open_check signal 322 high. If one of lines 302a-d of mesh grid layer 104 is breached then the discrepancy in input values to XOR gates 306a-d indicates an open line 302 by outputting a high signal, thereby causing signal fault_open 394 to be high. Fault signal 392 indicates a discrepancy between a signal value detected on a line 302 and a reference signal driving that line (e.g. reference signal Q 318 or signal QN 320). However, in some circumstances, this discrepancy may by due to electromagnetic induction (EMI). Fault_open signal 394 provides a definitive result as to whether one of lines 302 has been cut since open_check signal 322 couples inputs of XOR gates 306 to ground if a corresponding line 302 is cut, thereby eliminating the possibility of EMI causing a false positive result on fault signal 392. However, fault_open signal 394 does not definitely resolve a short in lines 302.

In an example, if grid line 302a is cut or shorted its value will differ from that of input signal Q 318. As a result, XOR gate 306a outputs a high signal indicating that line 302a of mesh grid 104 has been breached or shorted. In another example, if grid line 302d is cut or shorted, XOR gate 306d outputs a high signal indicating that line 302*d* of mesh grid 104 has been breached or shorted. The high signal from XOR gate 306 is propagated via OR gate 370 resulting in signals fault 392 and fault_open 394 (if open_check is high) going high to indicate an open or short line 302.

Ground plane 102 also provides an additional means of security. Accessing grid layer 104 by cutting through ground plane 102 may cause ground plane to come in contact with grid layer 104 resulting in a short that will be detected by detection layer 360.

FIG. 3 depicts clock toggle_grid signal 324 as driving flip-flop 301 and flip-flop 380. In an alternate embodiment, a first clock is used for the flip-flop 301 and a second clock is used for flip-flop 380. Additionally, the clocks may have different rates. For example, it may be desirable to toggle at a much slower rate then detection (on the fault side). For example, detection may occur every clock cycle and toggle may occur every fifth clock cycle to save power. The detection circuit could be sampling continuously. In an example, polarity of lines in grid 104 is toggled at a rate "n" with n being, for example, 1 second, 500 ms, 250 ms or 125 ms. Whether a line 302 in grid 104 is open or shorted may be checked at a rate of n for a duration of x/32.768 kHz where x is, for example, 2, 4, 8 or 16.

As described above, signals on lines 302 are either alternated, toggled or randomized at each clock cycle 324 using flip-flop 301 or an LFSR. Therefore, if a hacker is attempting to mimic an input, the attacker would need to route all the way to the other side of grid 104, increasing the difficulty of an attack. This alternation/toggling prevents a hacker from shorting or cropping out the entire grid. For example, if all highs were in a row, a hacker could short out a set of grid lines or cut them without detection by the circuit. By alternating the high and low lines, a hacker would have to jumper around the zero or one lines to bypass protection. Furthermore, in an embodiment, at least two adjacent grid lines have opposite polarity.

Figure 4:
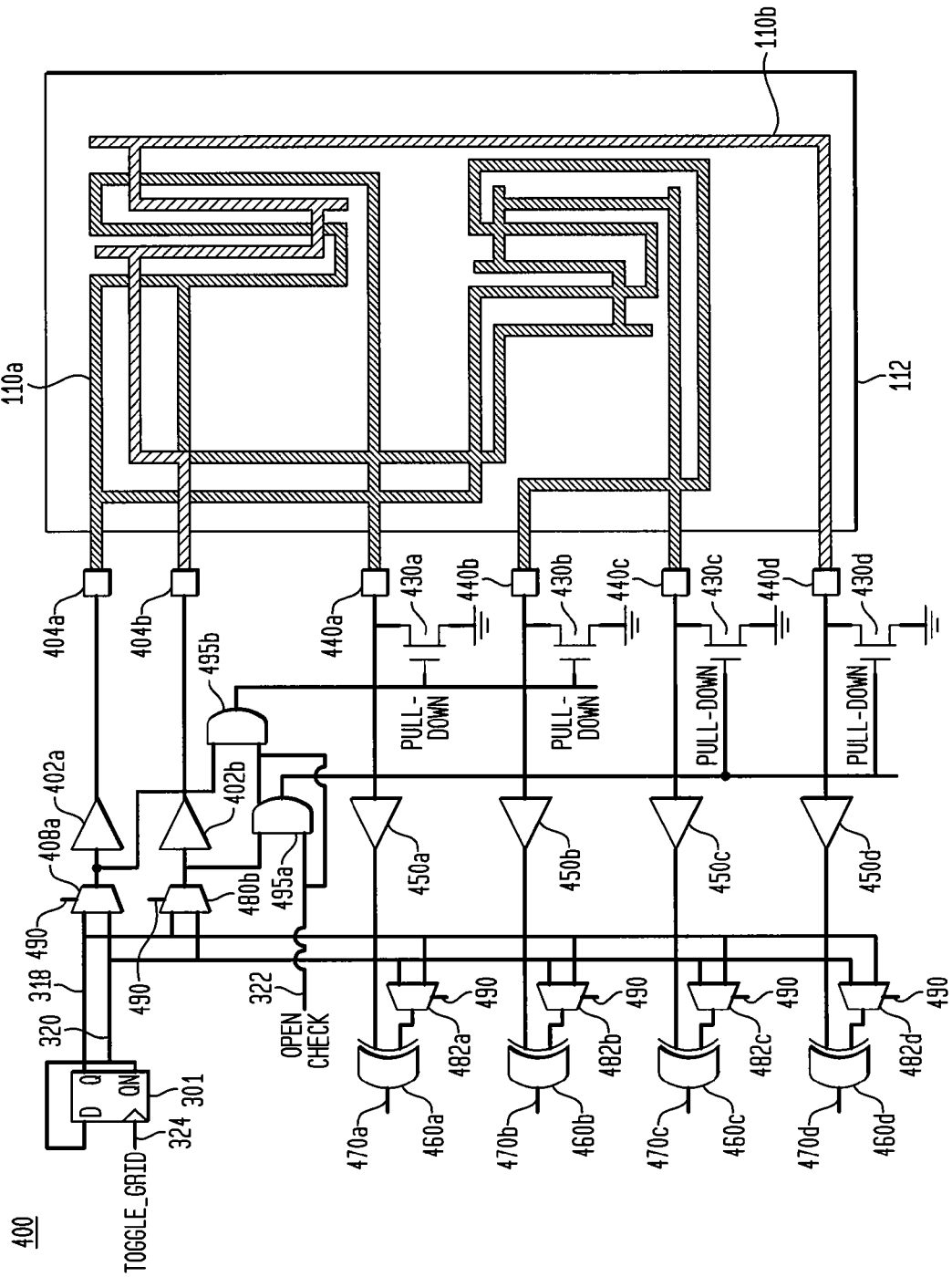
FIG. 4 illustrates an exemplary external mesh grid tamper detection system according to an embodiment of the invention.

FIG. 4 illustrates an external mesh grid system and tamper-detection system 400 according to an embodiment of the invention. External mesh grid system 400 comprises mesh grid 110*a-b*, bond pads 404*a-b*, 440*a-d*, input buffers 402*a-b*, output buffers 450*a-d*, pull-down circuits 430*a-d*, XOR gates 460*a-d*, muxes 480*a-b*, muxes 482*a-d*, AND gates 495*a-b* and flip-flop 301. As would be appreciated by persons of skill in the art, mesh grid 110 could include significantly more lines, as required by a specific implementation. Buffer 402 is used to drive a high or low signal via bond pad 404 into mesh grid 110. In an embodiment, grid 110*a* and grid 110*b* are on different layers of circuit board 112 or on different layers on a bottom portion of a package of an IC encapsulating logic 106. Alternatively, grids 110*a-b* may be a single grid 110 if they are on the same layer of a circuit board or package.

Flip-flop 301 is coupled to input buffer 402 that drives signal 318 or signal 320 into grid 110*a-b* via bond pad 404 based on polarity signal 490 which is used as a select signal for muxes 480*a-b*. In an alternate embodiment, an LFSR is used to provide a signal to drive grid 110. Bond pads 440*a-d* are respectively coupled to pull-down circuits 430*a-d* and to output buffers 450*a-d*. Output buffers 450*a-d* are respectively coupled to XOR gates 460*a-d*. Signal 318 and signal 320 from flip-flop 301 are coupled to XOR gates 460*a-d* via muxes 482*a-d* respectively. Muxes 482*a-d* are also controlled by polarity signal 490.

During operation, bond pads 440*a-d* mirror signal 318 or signal 320 propagated via bond pad 404*a* and bond pad 404*b* if the integrity of mesh grid 110*a* or 110*b* is maintained. Alternating or random high and low signal values are propagated through buffer 402 into mesh grid 110. The output of buffer 450*a-d* should match that of corresponding buffers 402*a-b* when the integrity of mesh 110*a-b* is not compromised by an open or a short circuit. If an unauthorized user attempts to access logic 106 via grid 110 by cutting grid 110 or causing a short in grid 110, the value at buffers 450*a-d* will not match that of input buffers 402*a-b* thereby indicating that integrity of mesh 110 has been compromised. XOR gates 460*a-d* are used to detect if the values at buffers 450*a-d* are the same as that at corresponding buffers 402*a-b* by comparing the output of buffers 450*a-d* to reference signal 318 and signal 320 driving grid 110*a-b*. If there is a discrepancy in the values, then XOR gate 460*a-d* output a corresponding high value on fault signal 470*a-d*. Discrete fault signals 470*a-d* enable the detection of which parts of mesh grids 110*a-b* have been breached. In an alternate embodiment, fault signals 470*a-d* may be combined into a single fault signal using an OR gate (not shown).

Pull-down circuits 430*a-b* are coupled to an output of AND gate 495*b* and pull-down circuits 40*c-d* are coupled to an output AND gate 495*a*. AND gates 495*a-b* are coupled to open_check signal 322 and to signal 318 or signal 320 via muxes 480*a-b*. Pull-down circuits 430*a-d* are configured to pull-down a signal to corresponding buffers 450*a-d* if open_check signal 322 is asserted low and corresponding grid 110*a-b* is cut or open.

It is to be appreciated by persons skilled in the art that pull-down described herein may be substituted with pull-up circuits along with corresponding changes to polarities of related signals as required by a specific implementation. It is also to be appreciated by persons skilled in the art that active high or active low circuits may be used as required by a specific implementation.

Figure 5:
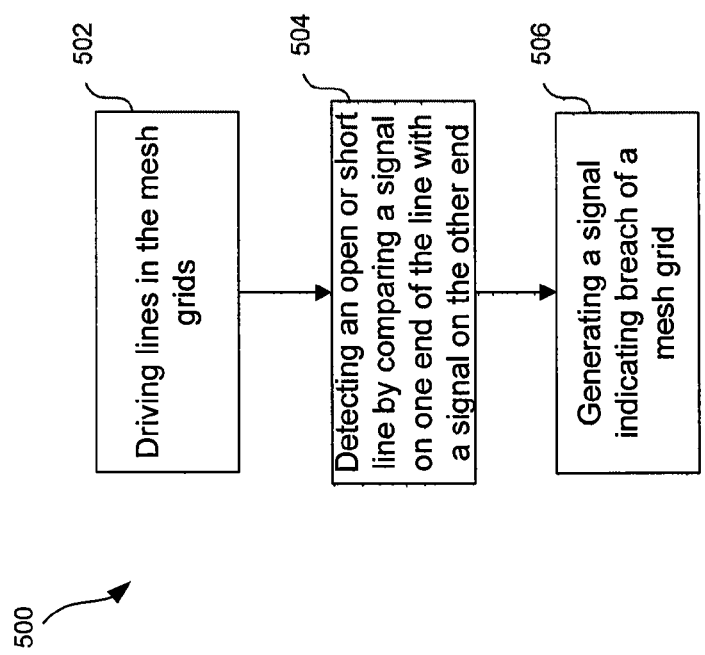
FIG. 5 illustrates an example flowchart of a method to provide a mesh grid protection system, according to an embodiment of the invention.

FIG. 5 illustrates an example flowchart 500 illustrating steps performed to implement a mesh grid protection system according to an embodiment of the invention. Flowchart 500 will be described with continued reference to the example operating environment in FIGS. 3 and 4. However, flowchart 500 is not limited to these embodiments. Note that some steps showing flowchart 500 do not necessarily have to occur in the order shown.

In step 502, a high and/or a low signal is driven on lines in the grid at each clock cycle. At least two adjacent grid lines have a different polarity signal at each clock cycle For example, the signal on lines in grid 104 and grid 110 may be alternated/toggled between a high and a low signal at each clock cycle if flip-flip 301 is used to drive grid 104 or grid 110. The signal on lines in grid 104 and grid 110 may be randomized as a high or a low signal each clock cycle if an LFSR is used to drive the grids.

In step 504, an open or a short line in a grid is detected by comparing signals on one end of the grid lines with correspond reference signals that are driving the grid lines on the other end. For example, using XOR gates 306 or XOR gates 460, an open or short line in grid 104 or grid 110 may be detected by comparing the value on grid lines on one end with respective reference signals driving the lines on the other end.

In step 506, one or more signals are set high indicating a possible attempt to access logic through the mesh grid if a discrepancy between signals on grid lines and reference signals driving the grid lines is detected in step 506. For example one or more of signal 392, signal 394, signals 470*a-b* are set high if a discrepancy between signals on respective grids 104 and 110 and signals driving grids 104 and 110 is detected. Alternatively, signal 392, signal 394 or signal 470a-b may be set low to indicate a breach in respective girds.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A mesh grid protection system, comprising:
   a plurality of grid lines forming a mesh grid proximate to operational logic; and
   tamper-detection logic coupled to the plurality of grid lines and configured to toggle a polarity of a signal on at least one grid line at each clock cycle and to detect attempts to access the operational logic by comparing a reference signal driving a first end of a grid line to a signal at the opposite end of the grid line.

2. The system of claim 1, wherein the mesh grid is incorporated in a die that includes the operational logic.

3. The system of claim 1, wherein the mesh grid is embedded in a plastic of a package including the operational logic.

4. The system of claim 1, wherein the mesh grid is external to a package including the operational logic.

5. The system of claim 1, wherein the mesh grid is partially in a die including the operational logic and partially in a package including the die.

6. The system of claim 1, wherein at least two adjacent grid lines have a different polarity.

7. The system of claim 1, wherein the tamper-detection logic is further configured to randomly toggle a polarity of a signal on each grid line at each clock cycle.

8. The system of claim 1, the tamper-detection logic comprising a linear feedback shift register (LFSR) configured to generate high or low signals driving each grid line.

9. The system of claim 1, the tamper-detection logic comprising a flip-flop configured to generate high or low signals driving each grid line.

10. The system of claim 9, wherein a first output of the flip-flop is coupled to an input of the flip-flop so as to alternate a value at the first output and a second output of the flip-flop at each clock cycle.

11. The system of claim 1, the tamper-detection logic comprising a plurality of XOR gates configured to detect an open or a short grid line by comparing the reference signal driving the first end of the grid line to the signal at the opposite end of the grid line.

12. The system of claim 1, the tamper-detection logic comprising receiving an enable signal causing the tamper-detection logic to detect an open grid line.

13. The system of claim 1, the tamper-detection logic comprising a plurality of buffers coupled to each grid line.

14. A method to provide a mesh grid protection system, comprising:
    driving a plurality of grid lines in a mesh grid with a high signal or a low signal;
    detecting an open or a short grid line in the mesh grid by comparing a reference signal driving a first end of the grid line to a signal at the opposite end the grid line; and
    generating a signal indicating an attempt to access operational logic proximate to the mesh grid;
    wherein at least two adjacent grid lines in the plurality of grid lines have a different polarity signal at each clock cycle.

15. The method of claim 14, the driving step further comprising toggling a polarity of a signal on at least one grid line at each clock cycle.

16. The method of claim 14, the driving step further comprising randomly toggling a polarity of a signal on each grid line at each clock cycle.

17. The method of claim 14, further comprising asserting an enable signal to check for open grid lines.

18. The method of claim 14, further comprising randomly assigning the high signal or the low signal on each grid line at each clock cycle.

19. The method of claim 14, further comprising using one of a flip-flop or a linear feedback shift register to generate the high signal or the low signal to drive lines the plurality of grid lines in the mesh grid.

20. The method of claim 19, further comprising coupling a first output of the flip-flop to an input of the flip-flop so as to alternate a value at the first output and a second output of the flip-flop at each clock cycle.

21. A mesh grid protection system, comprising:
    a plurality of grid lines forming a mesh grid proximate to operational logic; and
    tamper-detection logic coupled to the plurality of grid lines and configured to detect attempts to access the operational logic by comparing a reference signal driving a first end of a grid line to a signal at the opposite end of the grid line;
    wherein at least two adjacent grid lines in the plurality of grid lines have a different polarity signal at each clock cycle.

22. The system of claim 21, wherein the mesh grid is incorporated in a die that includes the operational logic.

23. The system of claim 21, wherein the mesh grid is embedded in a plastic of a package including the operational logic.

24. The system of claim 21, wherein the mesh grid is external to a package including the operational logic.

25. The system of claim 21, wherein the mesh grid is partially in a die including the operational logic and partially in a package including the die.

26. The system of claim 21, wherein the tamper-detection logic is further configured to randomly toggle a polarity of a signal on each grid line at each clock cycle.

27. The system of claim 21, the tamper-detection logic comprising a linear feedback shift register (LFSR) configured to generate high or low signals driving each grid line.

28. The system of claim 21, the tamper-detection logic comprising a flip-flop configured to generate high or low signals driving each grid line.

29. The system of claim 28, wherein a first output of the flip-flop is coupled to an input of the flip-flop so as to alternate a value at the first output and a second output of the flip-flop at each clock cycle.

30. The system of claim 21, the tamper-detection logic comprising a plurality of XOR gates configured to detect an open or a short grid line by comparing the reference signal driving the first end of the grid line to the signal at the opposite end of the grid line.

31. The system of claim 21, the tamper-detection logic comprising receiving an enable signal causing the tamper-detection logic to detect an open grid line.

32. The system of claim 21, the tamper-detection logic comprising a plurality of buffers coupled to each grid line.

\* \* \* \* \*